(12) United States Patent
McLelland (10) Patent No.: US 6,641,161 B1
(45) Date of Patent: Nov. 4, 2003

(54) APPARATUS AND METHOD FOR LEVELING A TRAILER BED

(76) Inventor: Gerald R. McLelland, 11543 W. Ricks Cir., Dallas, TX (US) 75230

( * ) Notice: Subject to any disclaimer, the term of this patent is extended or adjusted under 35 U.S.C. 154(b) by 0 days.

(21) Appl. No.: 10/045,859

(22) Filed: Oct. 19, 2001

(51) Int. Cl.[7] .............................................. B62D 53/06
(52) U.S. Cl. ............................... 280/441.1; 280/405.1; 414/481; 105/199.2
(58) Field of Search ........................... 280/405.1, 407.1, 280/412, 438.1, 446.1, 447, 455.1, 459, 467, 468, 462, 490.1, 441.1, 432; 414/481, 482, 495; 298/175; 105/199.2, 185

(56) References Cited

U.S. PATENT DOCUMENTS

| | | | | |
|---|---|---|---|---|
| 2,726,879 A | * | 12/1955 | Vaillant | 280/441.1 |
| 2,741,489 A | * | 4/1956 | Bigge | 280/426 |
| 2,833,561 A | * | 5/1958 | Vaugoyeau | 280/438.1 |
| 2,859,711 A | * | 11/1958 | Track | 105/453 |
| 3,438,652 A | * | 4/1969 | Hoffacker | 280/476.1 |
| 3,911,829 A | * | 10/1975 | Ross et al. | 105/157.1 |
| 4,357,878 A | * | 11/1982 | Fedele | 105/159 |
| 4,762,192 A | * | 8/1988 | Maxwell | 180/14.2 |
| 5,769,502 A | * | 6/1998 | Bettini | 298/17 S |
| 5,797,615 A | * | 8/1998 | Murray | 280/441.2 |
| 5,971,493 A | * | 10/1999 | Robert | 298/17 S |

FOREIGN PATENT DOCUMENTS

| | | | | |
|---|---|---|---|---|
| JP | 05162643 A | * | 6/1993 | B61F/5/24 |

* cited by examiner

Primary Examiner—Lesley D. Morris
Assistant Examiner—Daniel Yeagley
(74) Attorney, Agent, or Firm—Fellers, Snider, Blankenship, Bailey & Tippens, P.C.

(57) ABSTRACT

A leveling system for a load hauling trailer which will improve the stability of a payload having a high center of gravity, thereby allowing loads, which would otherwise not be transportable, to be moved over roadways. The leveling system includes a base member with a curved upper surface, a slide member with a curved lower surface, and a hydraulic cylinder for sliding the slide member relative to the base member. As the slide member moves from side-to-side across the base member, the angle between the axis of slide member varies with respect to the axis of the base member. When installed at each end of a double gooseneck trailer, the leveling system will reduce or eliminate torsional stresses in the trailer as the front running gear traverses a road surface having a cross grade different from the surface being traversed by the rear running gear.

5 Claims, 8 Drawing Sheets

APPARATUS AND METHOD FOR LEVELING A TRAILER BED

BACKGROUND OF THE INVENTION

1. Field of the Invention

The present invention relates to a leveling system for a trailer. More particularly, but not by way of limitation, the present invention relates to a bed leveling system for a load hauling trailer to stabilize a payload and mitigate torsional stress on the trailer due to differences in the cross slope between the front and rear of the trailer.

2. Background of the Invention

Generally speaking, trailers for hauling a payload are well known in the art. Typically such trailers are connected to a tractor, commonly known as a "semi tractor", through a fifth-wheel type connector. Usually such trailers have no provision for leveling the payload while the trailer is being towed. This lack of leveling can cause loads with a high center of gravity to become unstable under certain conditions.

Stability problems can take on an even greater dimension when hauling exceptionally large, heavy loads. Specialty trailers for hauling such loads are well known in the art. Typically these trailers may include a relatively large number of axles to reduce the load per axle to an acceptable level. In a typical arrangement, such trailers include front running gear which includes a fifth wheel connector for attaching the trailer to a tractor for hauling; rear running gear; and a load unit, or bed, suspended by front and rear goosenecks from the front and rear running gear, respectively. The load unit is often configured to support the load fairly close to the ground, sometimes referred to as a "low boy" trailer, to provide greater head room when passing beneath overhead obstacles, such as power lines and overpasses. In addition, maintaining the load unit as close as possible to the ground provides improvement in the stability of the load, as well as facilitating loading and unloading of the trailer. Such trailers may be generically referred to as "double gooseneck" trailers.

As used herein, the term "running gear" is used to describe a combination of jeeps and/or dollies used to support a gooseneck.

Generally speaking, trailer connections may be broadly grouped into connections which are articulated to allow side-to-side rotation between the trailer and the towing vehicle, referred to herein as a "pivotal connection" and connections which do not allow side-to-side rotation referred to herein as a "moment connection" or "structural connection". Thus, a conventional trailer connected to a tractor by a fifth wheel connector would employ a pivotal connection while a double gooseneck trailer could have either type of connection at the front gooseneck and either type of connection at the rear gooseneck.

While the stability of the load is a concern with either type of connection, when moment connections are employed, torsional stresses may be induced in the trailer, or load unit, by unevenness in the road surface (i.e. different cross grade under the front and rear portions of the trailer). Such torsional stresses may be particularly damaging to double gooseneck trailers having moment connections at both the front and rear of the trailer. Cornering is known to compound problems with both the stability of the load and the introduction of unwanted torsional stresses in the load unit.

It is thus an object of the present invention to provide a leveling system for a trailer bed which will level, from side-to-side, at least one end of a trailer to improve the stability of loads having a high center of gravity.

It is still a further object of the present invention to provide a leveling system for trailers designed to haul large, heavy loads which will simultaneously level the front and rear portions of a load unit to improve the stability of payloads having a high center of gravity and to reduce torsional stresses in the load unit and the payload.

SUMMARY OF THE INVENTION

The present invention provides a leveling system for trailers of the type used to carry a payload. In one embodiment, the leveling system provides a base member, having a curved upper surface attached to the frame of a trailer and a slide member, having a mating, curved lower surface, attached to the bed of the trailer, or a gooseneck. Preferably, both curved surfaces have the same radius so that the curved surface of the slide member will have substantially full engagement with the curved surface of the base member when the leveling system is assembled. Hydraulic cylinders move the slide relative to the base such that the angle between the axis of the base and the axis of the slide may be controlled to level the bed of the trailer.

The system may be operated manually by providing a manual hydraulic valve to control flow of hydraulic fluid to each cylinder or, alternatively, an electronic level may be provided to automatically actuate electrically operated valves to adjust the hydraulic cylinders to maintain the attitude of the trailer bed.

When the system is installed on a conventional fifth wheel-type trailer having a pivotal connection, the leveling device is preferably located at the rear of the bed. It is also preferable that, in such a configuration, the curvature of the base member and the slide member is such that the center of gravity of the loaded bed remains substantially concentric with the center line of the rear axle.

When the inventive device is included on a double gooseneck trailer, front and rear leveling systems may be provided to reduce torsional stresses on the trailer when the trailer is moved over surfaces where the cross grade under the front running gear differs from the cross grade under the rear running gear. Such a system is particularly advantageous when both goosenecks connect to the front and rear running gear through moment connections.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
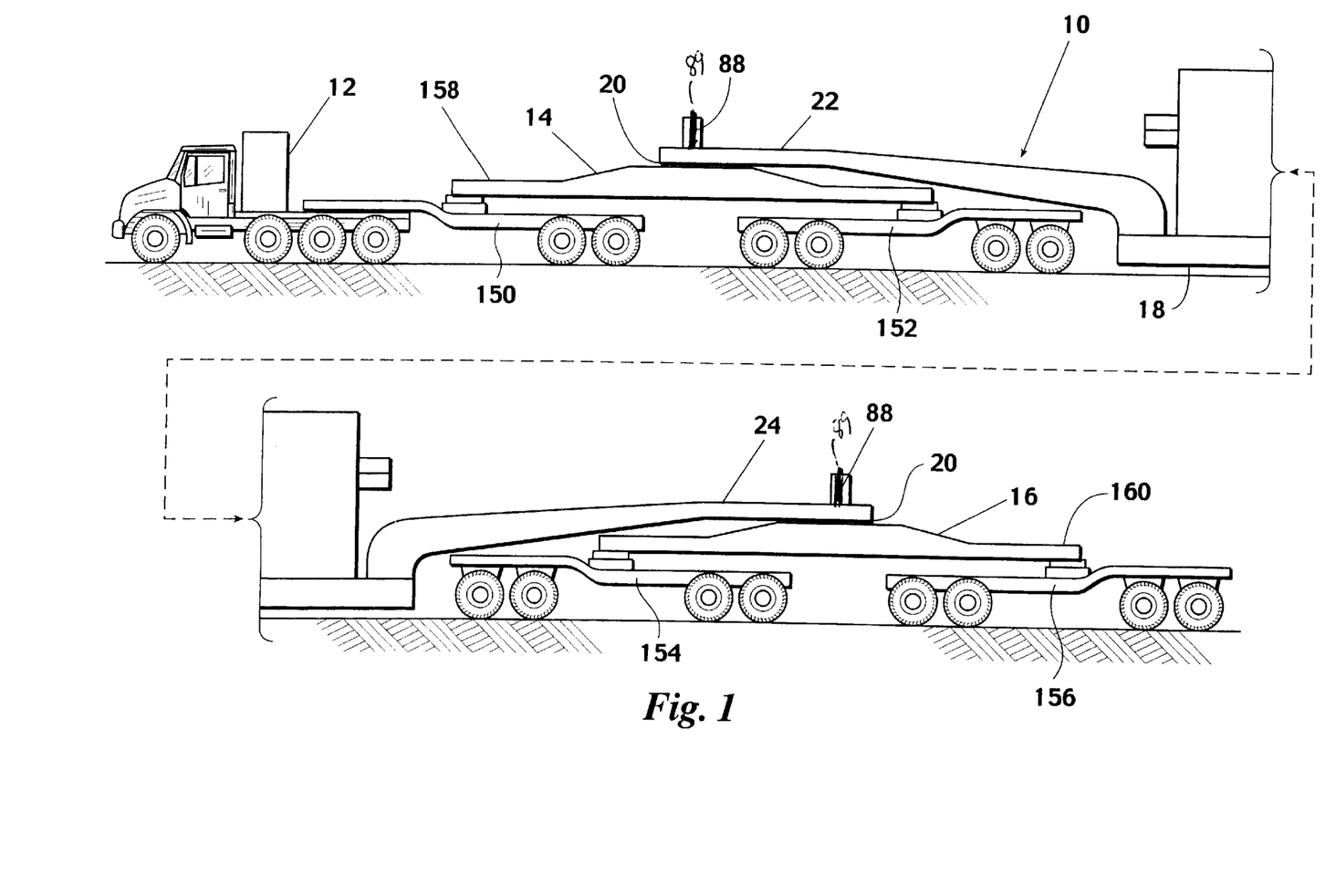
FIG. 1 shows the general environment of the inventive leveling system.

Referring now to the drawings, wherein like reference numerals indicate the same parts throughout the several views, the general environment of the inventive leveling system is shown in FIG. 1. A trailer 10, having a leveling system 20 (FIG. 9), is typically towed by a tractor 12. Trailer 10 is a double gooseneck trailer (also commonly known as a "low boy") having: front running gear 14 consisting of front jeep 150, steering dolly 152, and transfer beam 158; rear running gear 16 having front steering dolly 154, rear steering dolly 156, and transfer beam 160; a load unit 18 suspended between the front and rear running gear 14 and 16 by front and rear goosenecks 22 and 24, respectively. As will be described in more detail hereinbelow, trailer 10 includes first and second leveling systems 20 under the front and rear towers 88. While the preferred embodiment of the inventive leveling system 20 is shown and described as incorporated on a double gooseneck trailer, it will be apparent to those skilled in the art that the system may be installed on virtually any load hauling trailer or vehicle. It should also be noted that, while the preferred embodiment is described and shown in connection with a double gooseneck trailer having front and rear moment connections, the invention is not so limited. Double gooseneck trailers may be found which utilize one or more pivotal connections between the load unit and the running gear, the inventive system may be used with trailers having any combination of pivotal and moment connections.

The term "running gear" is used herein to describe a combination of jeeps and/or dollies used to support a gooseneck. While a typical configuration for a double gooseneck trailer is shown in FIG. 1, it should be understood that running gear may be provided in a large number of alternate configurations and the particular selection of running gear is not material to the present invention.

Figure 8:
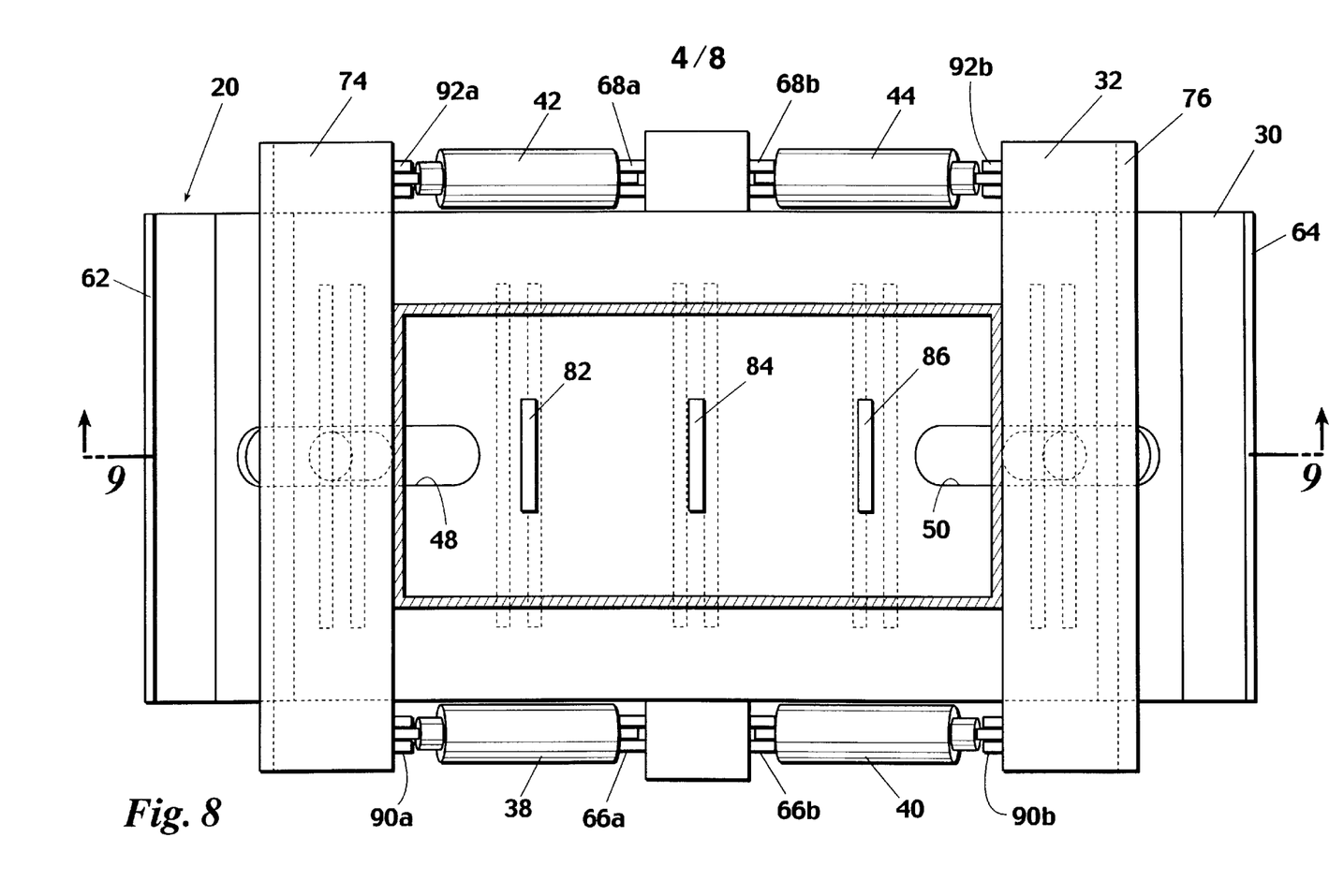
FIG. 8 provides a top view of an assembled leveling system.
Figure 9:
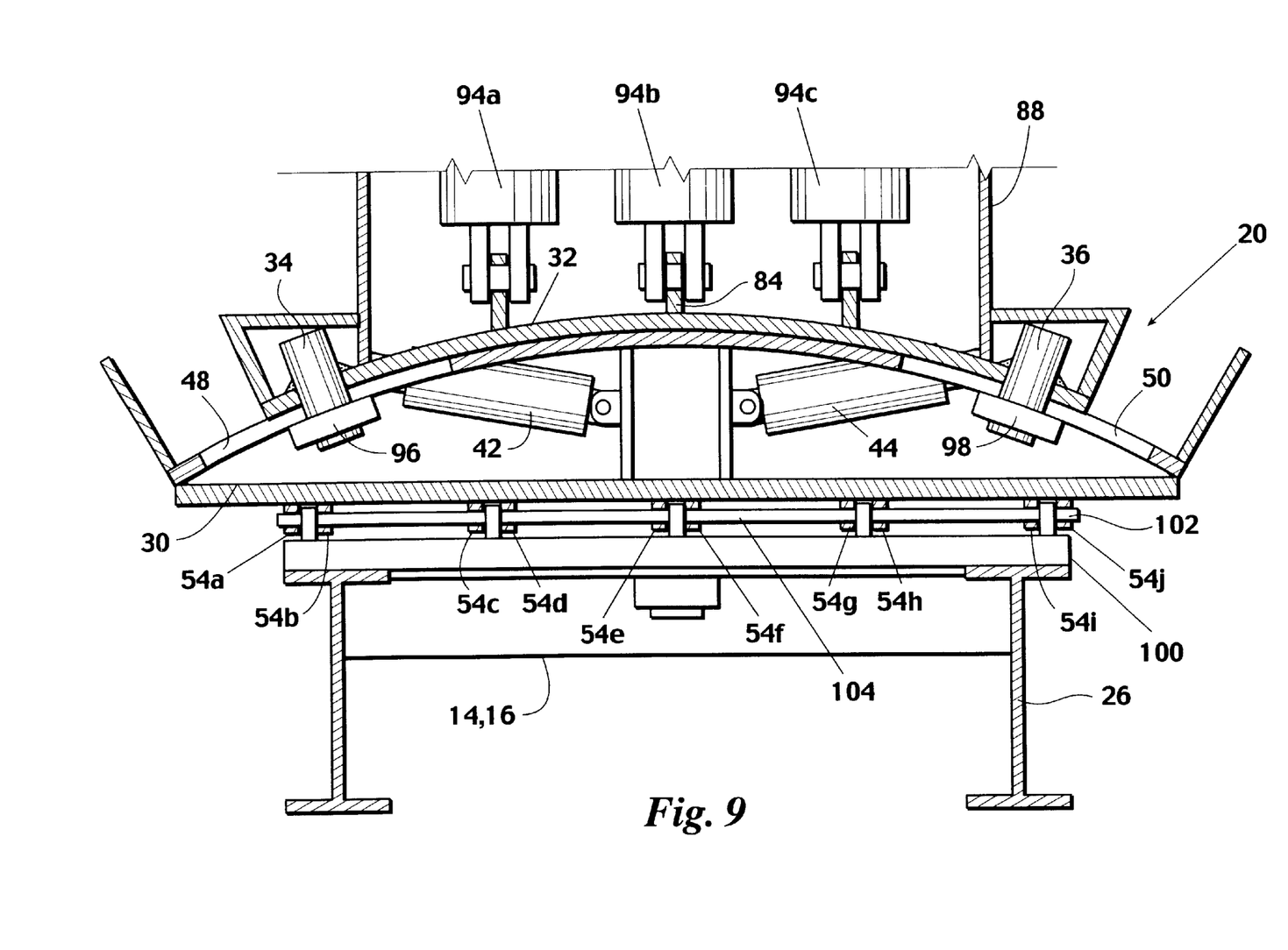
FIG. 9 provides a cross-sectional view of the inventive leveling system as seen form perspective 9—9 of FIG. 8.

Referring next to FIG. 9, leveling system 20 comprises a base member 30 mounted to the frame 26 of either front transfer beam 158 or rear transfer beam 160; a slide member 32 slidably secured to base member 30 by a pair of guide pins 34 and 36; and a plurality of hydraulic cylinders (better seen in FIG. 8) 38, 40, 42, and 44 for adjusting the position of slide member 32 with respect to base member 30. Preferably, slide member 32 is attached to front and rear towers 88.

Figure 2:
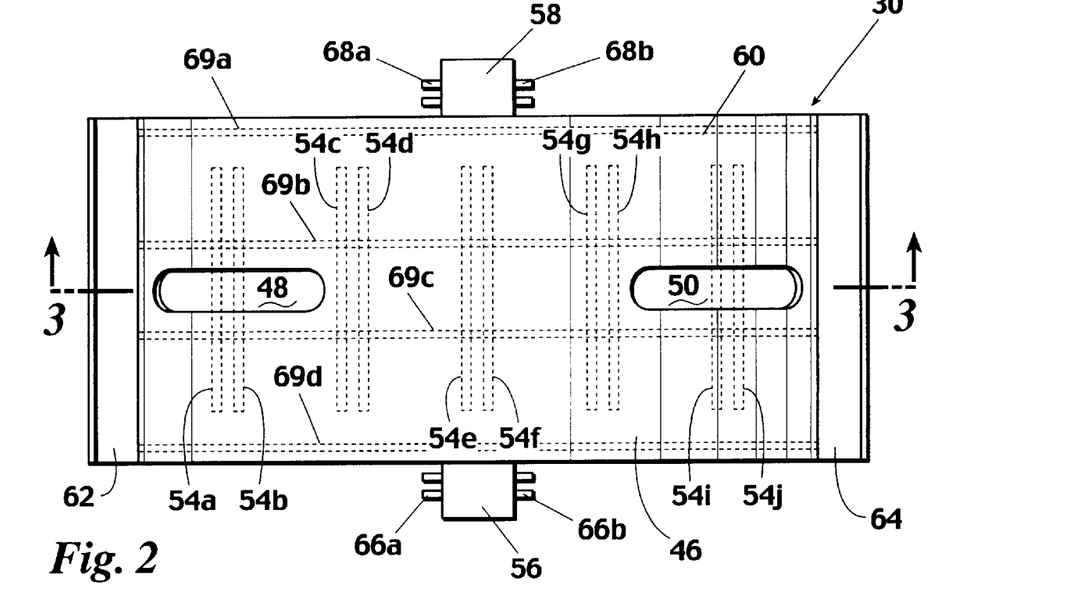
FIG. 2 provides a top view of the base member of the inventive leveling system.
Figure 3:
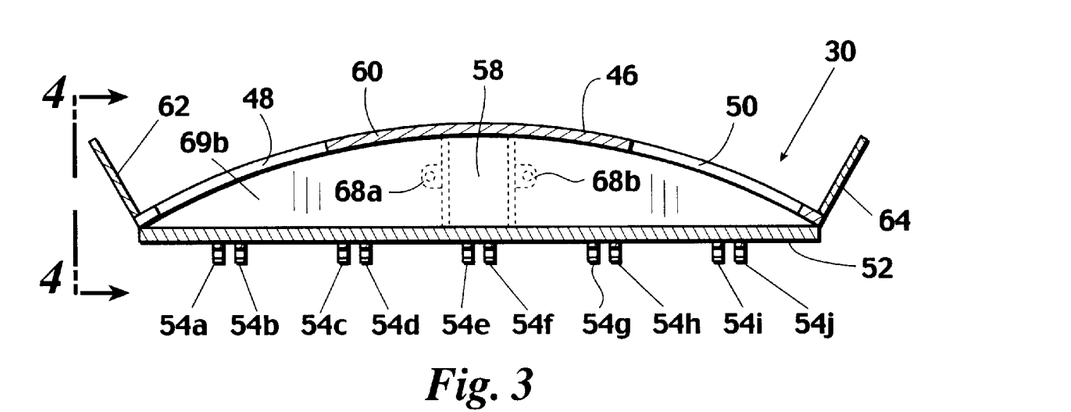
FIG. 3 provides a cross-sectional view of the base member as seen from perspective 3—3 of FIG. 2.
Figure 4:
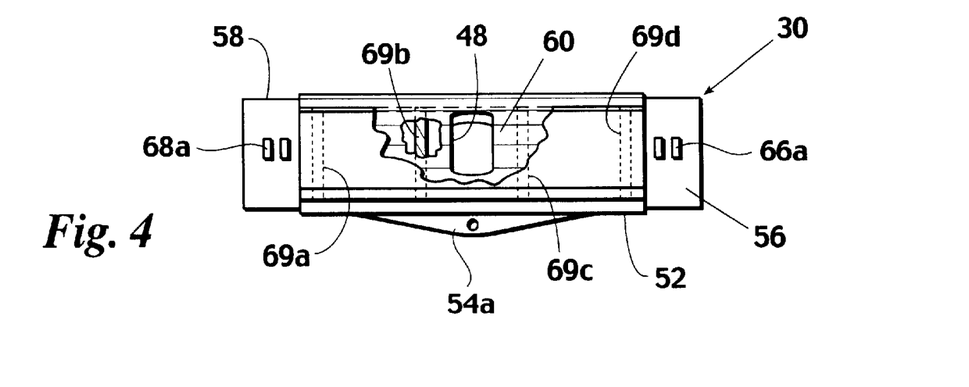
FIG. 4 provides a partial cut away side view of the base member as seen from perspective 4—4 of FIG. 3.

Referring now to FIGS. 2–4, base member 30 includes: a top plate 46 having a convex upper surface 60 and registering slots 48 and 50; bottom plate 52; hinge elements 54a–j projecting downward from plate 52; front base lug 56 and rear base lug 58 affixed between bottom plate 52 and top plate 46 at the front and rear of base member 30, respectively; and left and right stops 62 and 64, respectively, located along the outer sides of top plate 46. Front base lug 56 includes cylinder devises 66a and 66b and, similarly, rear base lug 58 includes cylinder devises 68a and 68b. Ribs 69a–d extend from bottom plate 52 to top plate 46 to support top plate 46.

Figure 5:
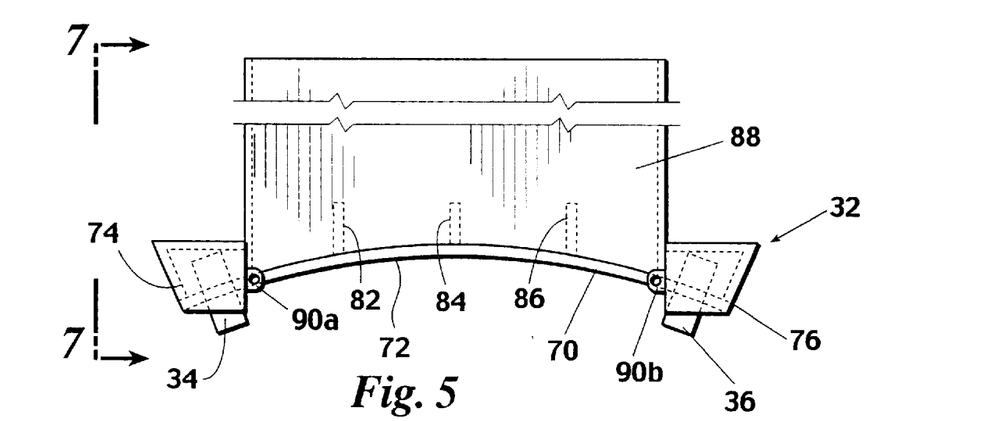
FIG. 5 provides a front view of a slide member incorporated in the inventive leveling system.
Figure 6:
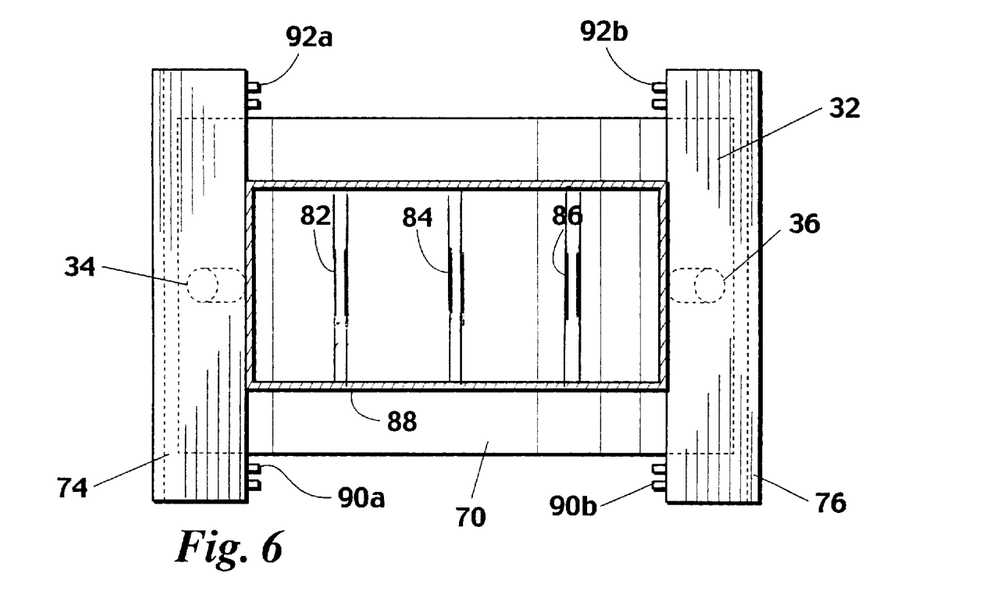
FIG. 6 provides a top view of the slide member.
Figure 7:
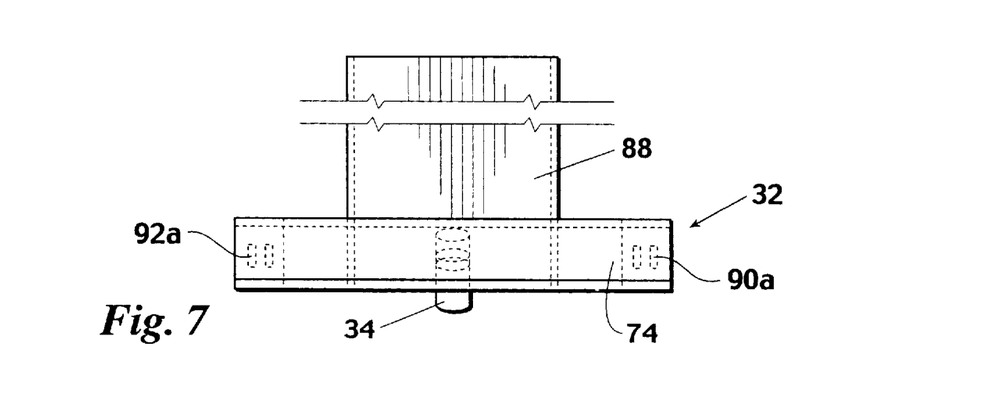
FIG. 7 provides a partial side view of the slide member as seen from perspective 7—7 of FIG. 5.

Turning now to FIGS. 5–7, slide member 32 includes: a bottom plate 70 having a concave lower surface 72; left and right slide lugs 74 and 76, respectively; left and right registering pins 34 and 36, respectively; braces 82, 84, and 86; jacking tower 88 and front rod devises 90a and 90b and rear rod devises 92a and 92b. With further reference to FIG. 1, front and rear goosenecks, 22 and 24 are received over jacking towers 88 to allow the raising and lowering of load unit 18 to facilitate loading and unloading as well as to allow adjustment of the ground clearance of load unit 18. Typically, in such a construction, jacking cylinders 94a–c (FIG. 9) may be attached to braces 82, 84, and 86 to control the height of goosenecks 22 and 24.

Referring to FIGS. 8 and 9, to assemble the leveling system 20, slide member 32 is placed over base member 30 such that registering pins 34 and 36 project through registering slots 48 and 50, respectively. It should be noted that, most preferably, concave surface 72 (FIG. 5) of slide member 32 is of the same radius as convex surface 60 (FIG. 3) of base member 30. Thus, it can be seen that slide member 32 is free to slide from side-to-side on base member 30, at least within the limits imposed on the right side by contact between slide lug 76 and stop 64, and on the left side by contact between slide lug 74 and stop 62. Registering pins 34 and 36, and registering slots 48 and 50, work in concert to prevent longitudinal movement between base member 30 and slide member 32. As will be apparent to those skilled in the art, when slide member 32 is centered on base member 30, jacking tower 88 will be substantially perpendicular to bottom plate 52. As slide member 32 moves to the right, the angle between the jacking tower 88 and the right side of bottom plate 52 will become progressively smaller. Likewise, as slide member 32 moves to the left, the angle between the jacking tower 88 and the left side of bottom plate 52 will become progressively smaller. Thus, it can be seen that, by controlling the side-to-side position of slide member 32 relative to base member 30, it is possible to maintain the jacking tower 88 in a plumb position while base member 30 rocks in response to changes in the cross grade of a road surface.

To control the side-to-side position of slide member 32, hydraulic cylinder 38 is mounted between clevis 66a and clevis 90a, cylinder 40 is mounted between clevis 66b and clevis 90b, cylinder 42 is mounted between clevis 68a and clevis 92a, and cylinder 44 is mounted between clevis 68b and clevis 92b. By proper application of hydraulic fluid under pressure to the various cylinders, the precise position of slide member 32, and hence the angle of jacking tower 88, may be controlled. It should be noted that hydraulic cylinders are generally available in either single acting, or double acting models. Either type of hydraulic cylinder is suitable for use with the present invention. It should also be noted that a number of alternatives could also be employed for positioning slide member 32. By way of example and not limitations, such slide means could also include pneumatic cylinders, electromagnetic linear actuators, rack and pinion mechanisms, and the like.

Continuing with FIG. 9, preferably retainers 96 and 98 are attached to the ends of registering pins 34 and 36 to ensure pins 34 and 36 remain in their respective slots. The assembled leveling system 20 is typically attached to a turntable 100 by way of hinge 104 comprising hinge elements 54a–j and hinge pin 102. Turntable 100 is, in turn, attached to the frame 26 of the transfer beam 158 or 160 to allow turning of the running gear 14 or 16 relative to load unit 18. Hinge 104 allows front-to-back angular displacement between the running gear 14 or 16 and tower 88. As will be appreciated by those skilled in the art, allowing rotational freedom by way of the turntable 100 and hinge 104 is most preferable to allow trailer 10 to negotiate a typical roadway.

Figure 11:
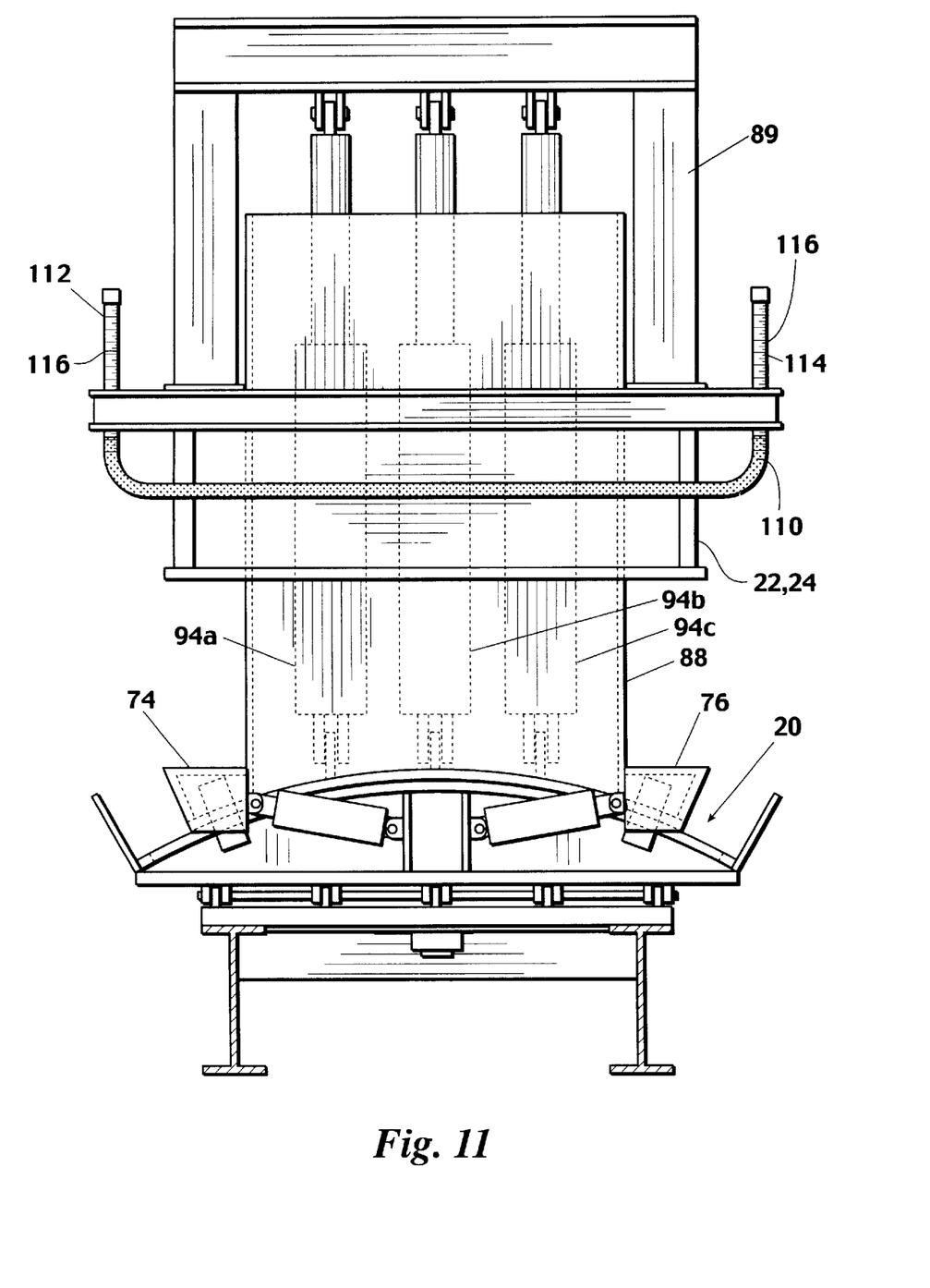
FIG. 11 provides a partial front view of a trailer having the inventive system and a visual level for adjusting the system.

Referring to FIG. 11, goosenecks 22 and 24 are slidingly received over towers 88, cylinders 94a–c are connected between the leveling system 20 and jacking frame 89 to allow the lifting and lowering of goosenecks 22 and 24. In practice, cylinders 94a–c would typically be collapsed to fully lower goosenecks 22 and 24 for loading and unloading load unit 18. For hauling a load, cylinders 94a–c would typically be extended to raise load unit 18 to achieve a desired ground clearance and blocks would be placed between gooseneck 22 or 24 and side lugs 74 and 76 to maintain the desired height.

Figure 10:
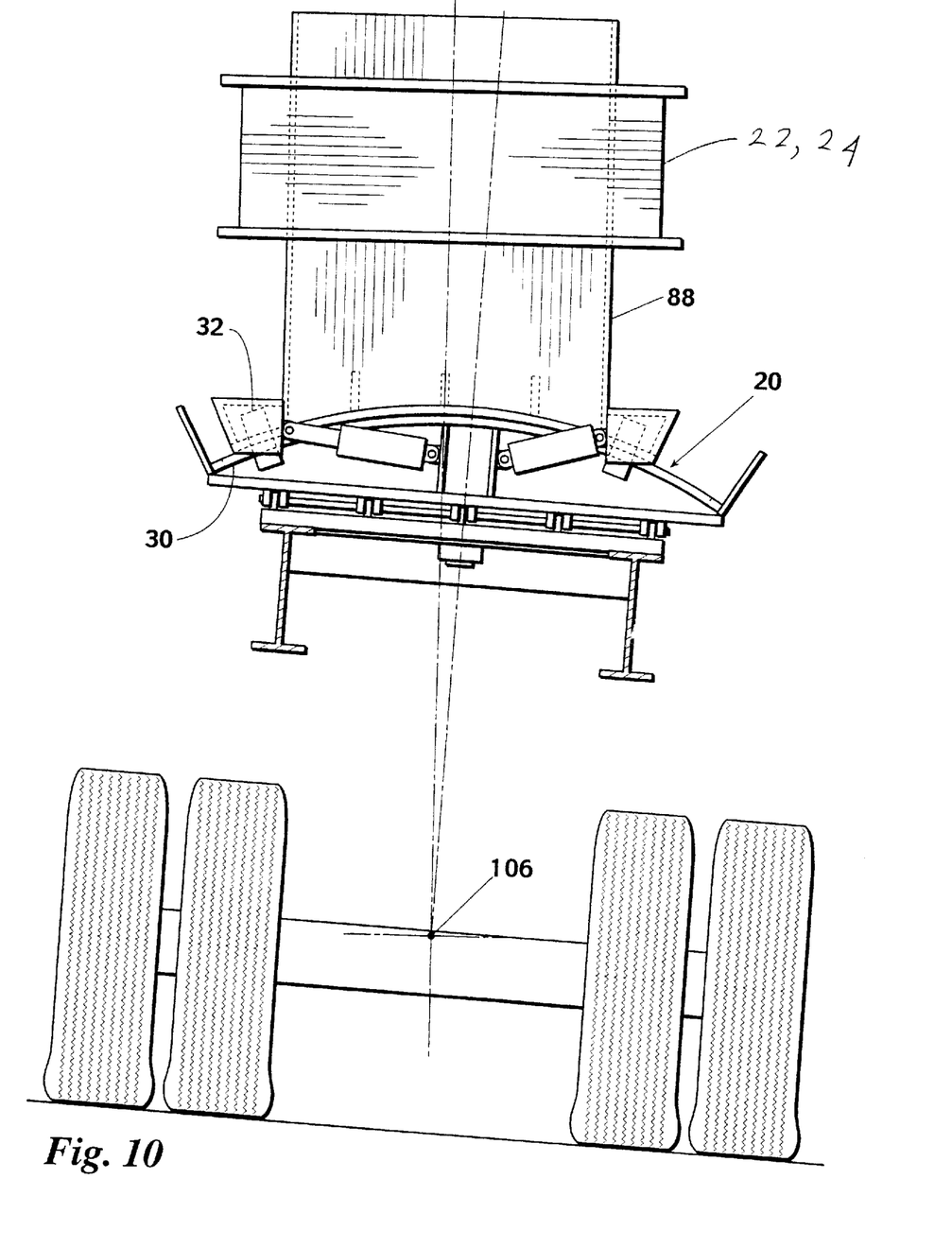
FIG. 10 provides a front view (or rear view) of the inventive leveling system mounted on a trailer.

As will be apparent to those skilled in the art, a number of modifications could be made to the inventive leveling system without departing from the scope or spirit of the present invention. For example, the slide member could be provided with a convex surface while providing the base member with a concave surface. While such a modification is withing the scope of the present invention, the method of the preferred embodiment is somewhat more advantageous. Referring to FIG. 10, it can be seen that, by a judicious selection of the radius of slide member 32 and base member 30, that the slide may move in an arc concentric about the center of axle 106. Thus, as the leveling system 20 is adjusted to keep the force vector aligned with jacking tower 88, the vector will pass roughly through the center of axle 106 to best distribute the load across the tires.

It should also be noted that, as mentioned previously, the inventive leveling system may be adjusted manually (i.e., using manual valves to control the flow of hydraulic fluid to the cylinders) or automatically. The connection of the hydraulic cylinders through manual valves is well within the skill level of one of ordinary skill in the art. With double acting cylinders, for example, the rod side of cylinders 38 and 42 (FIG. 8) would be connected with the chamber side of cylinders 40 and 44 in a first hydraulic circuit. Likewise, the rod side of cylinders 40 and 44 would be connected with the chamber side of cylinders 38 and 42 in a second hydraulic circuit. Thus, when pressure is applied to the first circuit and fluid is drawn from the second circuit, the cylinders will push slide member 32 to the right. When hydraulic pressure is applied to the second circuit, and fluid is drawn from the first circuit, slide member 32 will instead move to the left.

In a manual configuration, as shown in FIG. 11, a liquid level 110 may be attached to the front of tower 88 so that the level is in view of an operator. Typically, at least the outer ends 112 and 114 of tube 110 are formed of a transparent, or translucent material. Obviously, as an unlevel road surface is encountered, the height of the fluid on one side of level 110 will be higher than in a level condition, while the fluid on the opposite side will be lower than in a level condition. Graduations 116 are provided on each side of level 110 to assist the operator in determining the degree of correction required. Thus the operator may simply operate manual hydraulic valves to adjust the leveling system 20 to maintain even fluid heights between the left and right sides of level 110.

Figure 12:
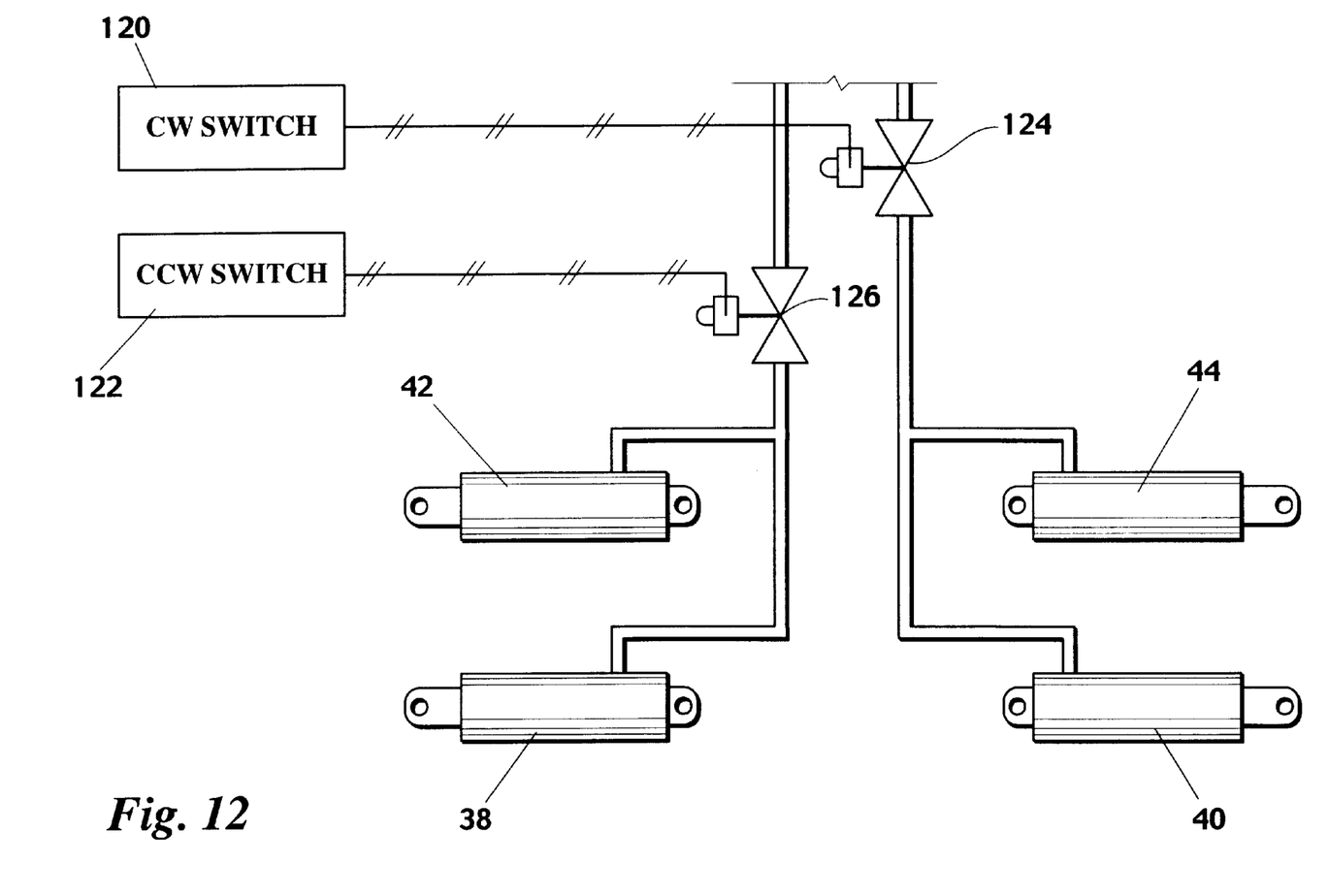
FIG. 12 provides a block diagram for a system to automatically maintain the trailer bed in a level attitude.

In an automatic system, as shown in FIG. 12, switches 120 and 122 are used to detect an unlevel condition and operate solenoid valves 124 and 126, in response, to return the load unit to a level condition. A number of methods may be used to determine an out-of-level condition. By way of example and not limitation, an led/photodetector pair could be placed to detect a rise in the fluid level on either side of level 110 of FIG. 11. Upon detecting the rise in fluid level, the appropriate valve would be opened to correct the unlevel condition. Alternatively, a pair of mercury switches could be positioned such that a clockwise rotation would cause one mercury switch to close while a counterclockwise rotation would close the other switch. Each mercury switch would control a valve to control the hydraulic fluid to correct the unlevel condition. An inclinometer or electronic vial level are other examples of electronic level detecting means which could be employed in an automatic leveling system.

In a situation where the road under the front running gear a cross grade significantly different than the road under the rear running gear, independently acting front and rear leveling systems will reduce, or eliminate, torsional forces in the load unit. In addition, it is possible that, if a load is securely tied to the load unit, unwanted torsional forces could also be transferred to the payload. In the preferred embodiment, front and rear leveling systems are preferred as depicted in FIG. 1. However, it should be noted that where one or two pivotal connections are employed, a single system could be used to improve leveling of the load over prior art trailers.

It should also be noted that the inventive device is suitable for use with a conventional fifth wheel trailer having a single pivotal connection at the front of the trailer. Preferably, the base member would be attached above the rear axle. The bed of the trailer would attach to the top of the slide member allowing leveling of the trailer from the rear. As will be apparent to those skilled in the art, the fifth wheel connection allows some variation in pitch angle between the tractor and trailer so that a single leveling system could level the entire trailer from the back end of the trailer without inducing significant torsional stresses.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A leveling system for a trailer comprising:
   a base member having a curved upper surface, said base member having a first axis perpendicular to a center of said curved upper surface;
   a slide member having a curved lower surface, said curved lower surface in sliding contact with said curved upper surface, wherein said slide member includes a second axis perpendicular to a center of said curved lower surface; and
   a slide position means for moving said member relative to said base member such that, an angle between said first axis and said second axis varies as said slide member is moved relative to said base member.

2. The leveling system of claim 1 wherein said upper curved surface is convex and said lower curved surface is concave.

3. The leveling system of claim 1 wherein said slide position means comprises a plurality of hydraulic cylinders each of said cylinders having a cylinder end and a rod end and wherein the cylinder end of each hydraulic cylinder is connected to either said slide member or said base member and the rod end of each cylinder is connected to the other of either said slide member or said base member.

4. The leveling system of claim 3 further comprising a manual valve in hydraulic communication with said plurality of hydraulic cylinders so that, upon actuation of said valve by an operator, said slide means will move said slide member relative to said base member.

5. The leveling system of claim 3 further comprising:
 a level detector having a first output indicative of a clockwise rotation of said level detector and a second output indicative of a counterclockwise rotation of said level detector;
 a first electrically operated hydraulic valve in electrical communication with said first output and in hydraulic communication with said plurality of hydraulic cylinders such that, upon an indication of a clockwise rotation, said first valve is actuated to drive said hydraulic cylinders to correct said clockwise rotation; and
 a second electrically operated hydraulic valve in electrical communication with said second output and in hydraulic communication with said plurality of hydraulic cylinders such that, upon an indication of a counterclockwise rotation, said second valve is actuated to drive said hydraulic cylinders to correct said counterclockwise rotation.

* * * * *